United States Patent Office 2,848,281
Patented Aug. 19, 1958

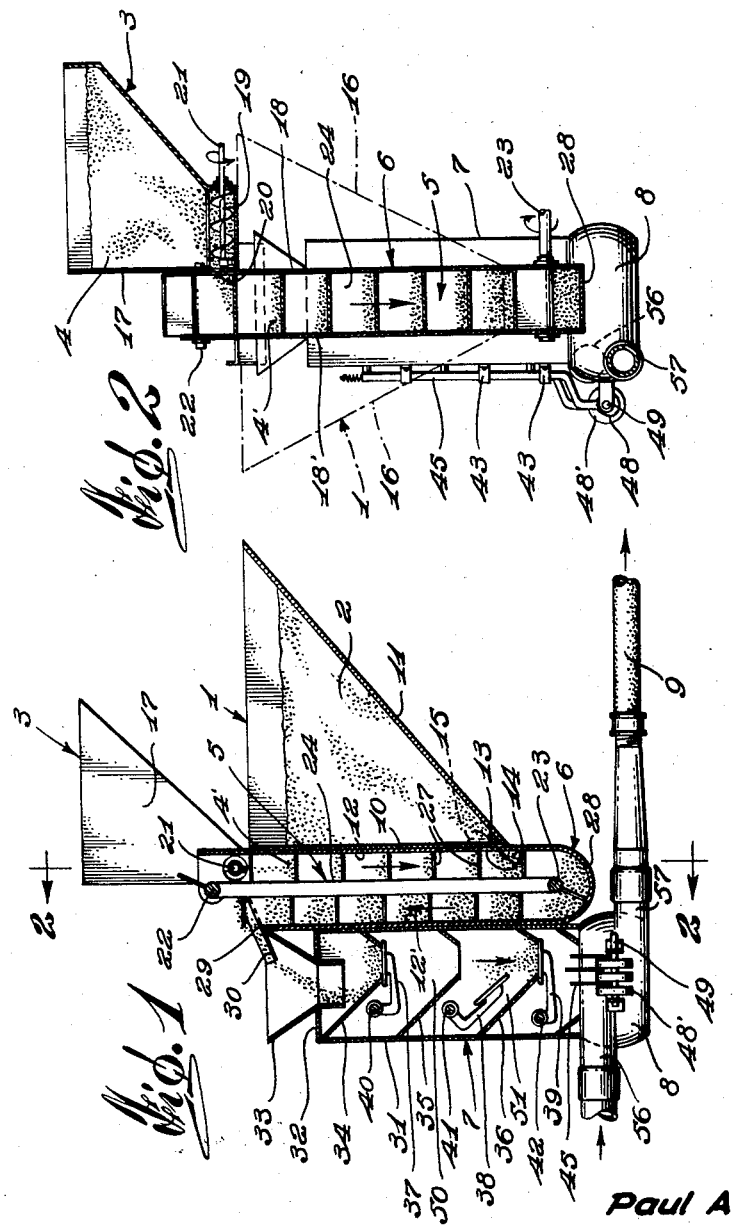

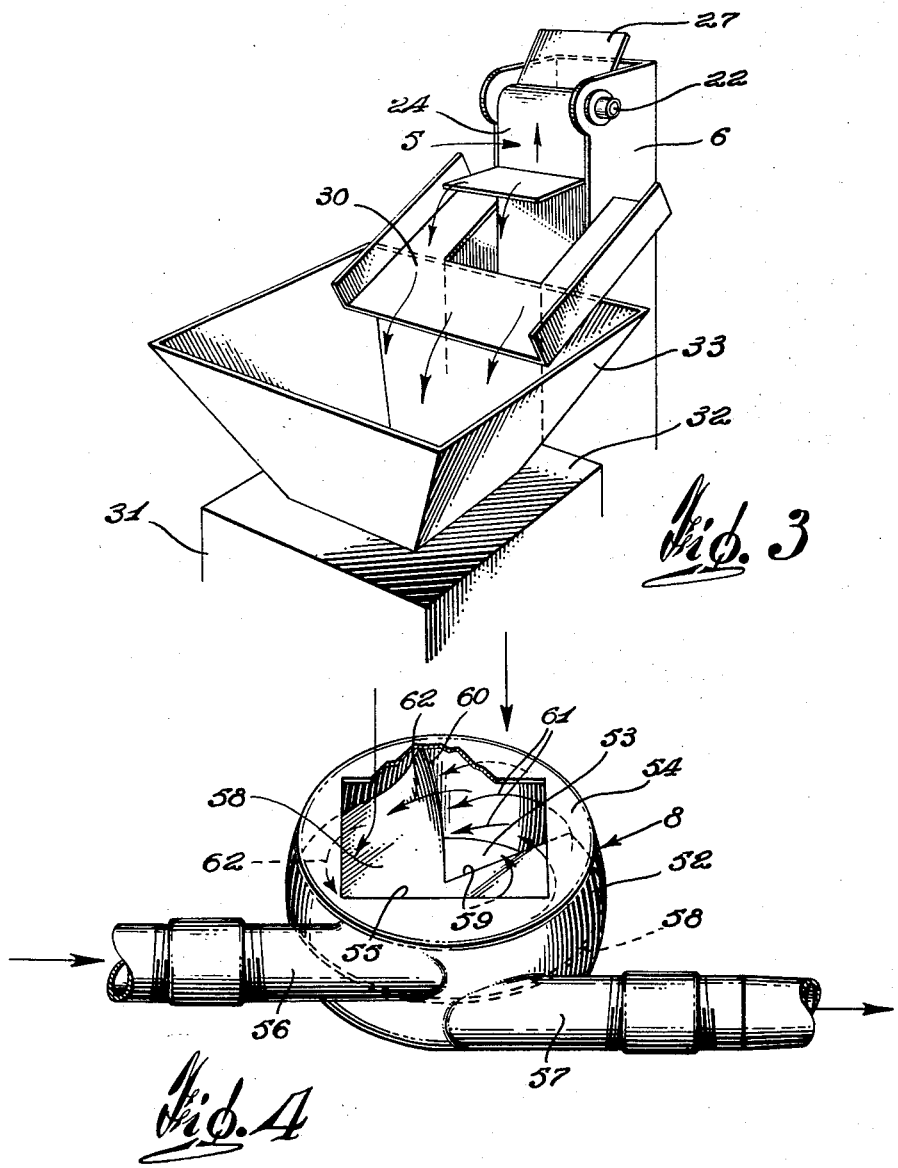

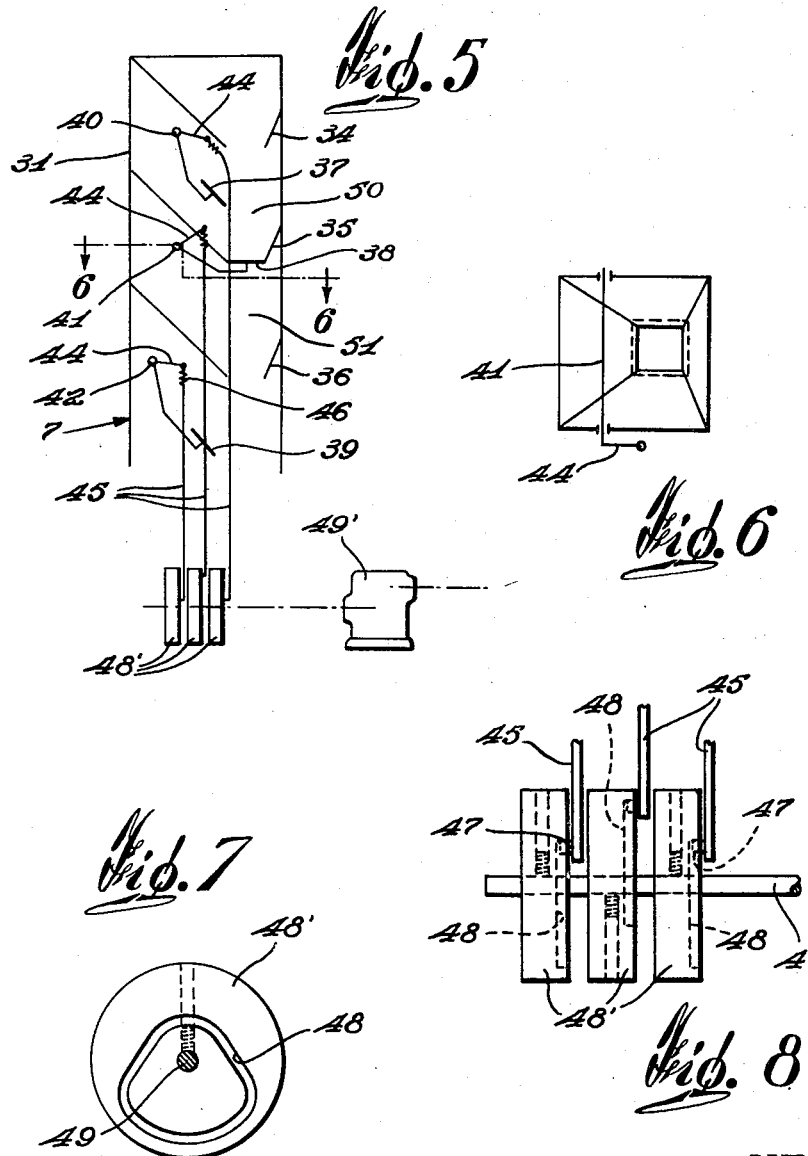

2,848,281

MEANS FOR SPREADING SEEDED TOP SOIL

Paul Avard, Cap Rouge, Quebec, Canada

Application February 25, 1957, Serial No. 642,285

9 Claims. (Cl. 302—55)

The present invention relates to novel means for introducing batchloads of fine material into a gas stream and to an apparatus embodying said novel means and adapted for mixing and ejecting granular materials, at least one of which is in substantially moist condition.

The present invention relates more particularly to an apparatus and a method for quickly and easily spreading a seeding mixture including top soil, seeds, fertilizer and bacteria over ground or exposed sub-soil areas; thus, turfing may be effected over comparatively large areas and where such turfing would be impossible by ordinary methods.

The method and apparatus, according to the present invention, have been found particularly useful for turfing sloped embankments along newly built roads and the like and also grounds around new buildings.

The method, according to the present invention, consists essentially in levelling the sub-soil, mixing a quantity of top soil with a proportionate amount of grass seed, and chemicals, admitting said mixture into a gas stream to be propelled thereby, and directing the resultant stream over the exposed sub-soil and covering the same with the desired thickness of top soil containing the grass seed mixture.

An object of the present invention is the provision of an equipment adapted to carry out the method according to the present invention, said equipment being constructed for mobility and for speed of operation.

Yet another important object of the present invention is the provision of an equipment of the character described which is capable of blowing the seed mixture and the top soil by means of a gas stream in an efficient manner despite the fact that the top soil is normally in substantially moist condition and tends to stick to the inner surfaces of the apparatus.

Still another important object of the present invention is the provision of an apparatus of the character described which is provided with an improved means for admitting the top soil and seed mixture into the gas stream without choking the conduit for said gas stream.

Yet another important object of the present invention is the provision of equipment of the character described which is efficient in operation and which takes up a minimum of space so that it can be readily mounted on a tractor or the like motor vehicle.

Another object of the present invention is the provision of means for introducing batch loads of fine material into a gas pressure stream so arranged as to avoid clogging of the conduits.

The equipment, according to the present invention, is capable of blowing the mixture to a distance of three hundred feet and thereby cover otherwise inaccessible areas. The blown mixture penetrates the sub-soil sufficiently to become fixed without requiring any subsequent compacting operation, even on ground having a slope up to a 45° angle.

The foregoing and other important objects of the present invention will become more apparent during the following disclosure and by referring to the drawings in which:

Figure 1 is a longitudinal section of the apparatus;
Figure 2 is a cross-section along line 2—2 of Figure 1;
Figure 3 is a partial perspective view of the top portion of the apparatus;
Figure 4 is a partially cut away perspective view of the chamber or housing for introducing the seeded top soil or other granular material into the gas stream;
Figure 5 is a diagrammatic view of the air lock system;
Figure 6 is a section along line 6—6 of Figure 5;
Figure 7 is an elevation of a cam wheel; and
Figure 8 is an elevation of the assembly of cam wheels.

Referring now more particularly to the drawings in which like reference characters indicate like elements throughout, the essential parts of the machine according to the present invention are shown in Figures 1 and 2. In said figures, reference numeral 1 indicates a hopper for the top soil 2, and reference numeral 3 indicates a secondary hopper of smaller size than the hopper 1 and adapted to contain the grass seed and fertilizer mixture 4.

An endless conveyor 5 is vertically disposed within a conveyor housing 6 and is adapted to receive and convey the top soil 2 and the seed 4 and to discharge the same into an air lock system, generally indicated at 7. From the air lock system 7 the top soil and seed mixture is discharged into a housing 8, wherein it enters a high velocity gas stream which propels the mixture through a flexible hose 9 for directing and spreading the propelled mixture over the sub-soil to be covered with the mixture.

The hopper 1 is preferably of funnel shape and its vertical wall 10 opposite the inclined wall 1 is directly secured to a vertically disposed side wall 12 of conveyor housing 6. The hopper 1 discharges the top soil 2 by gravity into the conveyor housing 6 through an opening 13 made in the vertical side wall 10 at the bottom of the hopper and registering with an opening 14 made in the vertical wall 12 of the conveyor housing 6. A horizontally slidable gate 15 is adapted to regulate the amount of top soil discharged into the conveyor housing 6. The side walls 16 of the hopper 1 joining the vertical wall 10 and the inclined wall 11 of said hopper 1 are downwardly inclined towards the openings 13 and 14, as clearly shown in dot and dash lines in Figure 2.

The hopper 3 for the grass seed mixture 4 is of smaller dimensions than the hopper 1, but has substantially a similar shape except that one of its side walls is vertical, as shown at 17. The vertical wall 17 of the hopper 3 is mounted adjacent the side wall 18 of the conveyor housing 6, the latter extending at right angles to the previously mentioned side wall 12. A feeding screw 19 is mounted in the bottom portion of the hopper 3 and is adapted to discharge the seed mixture 4 into the conveyor housing 6 through an aperture 20 made in the wall 18 of said housing 6. The shaft 21 of the feeding screw 19 is connected to suitable driving means such as a hydraulic motor (not shown) which can be rotated at an adjustable variable speed to regulate the quantity of seed to be mixed with the top soil.

The endless conveyor 5 comprises two vertically spaced parallel horizontally disposed shafts 22 and 23. The upper shaft 22 and the lower shaft 23 are journalled at the upper and lower ends of the side walls 18 and 18' of the housing 6, respectively. The lower shaft 23 is the driving shaft and is connected to suitable driving means, preferably a variable speed hydraulic motor (not shown). The endless conveyor further comprises an endless belt 24, preferably made of a rubber material, trained on the shafts 22 and 23 to provide a downwardly moving run which advances along the side wall 12 adjacent the hopper 1 and an upwardly moving run which advances along the wall 12' opposite the hopper 1. A plurality of substantially equally spaced flights 27 are attached to and extend at right angles to the belt 24. The flights 27 are of a size to slidably fit inside the housing 6 so that the lateral outer edges will continuously scrape the inside surfaces of said housing 6. In the embodiment illustrated, the seed mixture 4 is continuously discharged onto the uppermost flight 27 of the downwardly moving run and said seed, generally indicated at 4', moves downwardly and is covered by a load of top soil 2 discharged from the hopper through openings 13 and 14. The seed mixture and top soil are then mixed in the circular bottom 28 of the conveyor housing 6 and move upwardly to be discharged at the upper end 29 of the housing 6 over a downwardly inclined shelf 30 which directs the mixture into the air lock arrangement 7.

Although in the embodiment illustrated the conveyor run adjacent the main hopper 1 is shown as moving downwardly, the direction of movement of the conveyor could be inverted without substantially affecting the operation of the machine. Similarly, the illustrated positions of the discharge of the seed 4 and the top soil 2 onto the flights 27 of the endless conveyor 5 is not essential to the operation of the machine and could be changed to suit design requirements.

The air lock arrangement 7 comprises a vertically disposed chimney 31, preferably of rectangular cross-section and mounted adjacent the conveyor housing 6, and secured thereto. The bottom end of the chimney 31 is directly mounted and hermetically secured to the housing 8, while, the upper end of the chimney 31 is closed by a transverse top wall 32. A funnel 33 is mounted on and extends within said chimney 31. Three vertically spaced funnel-shaped partitions 34, 35 and 36 are disposed across the chimney 31 and their respective openings are adapted to be hermetically closed by gate valve members 37, 38 and 39 respectively, which are mounted for pivotal movement by means of their respective shafts 40, 41 and 42 which are journalled in the side walls of the chimney 31.

The gate valve members 37, 38 and 39 are operated as follows:

The shaft of each gate member is provided with a crank arm 44, the other end of which is pivotally connected to a link rod 45 through the interposition of a strong spring 46. The rods 45 are guided in a reciprocating axial movement in brackets 43 and their lower ends are each provided with a cam follower 47 which rides in a camway 48 made in a cam wheel 48'. There are three cam wheels 48' which are mounted on a common shaft 49 which is rotated by suitable driving means through a speed reducer 49'. The camways 48 have similar shapes but are angularly displaced in such a manner that upon rotation of their common shaft 49, the first and third gate valve members 37 and 39 will operate in substantially simultaneous manner, while the second gate valve member 38 will operate at 180° out of phase relationship. Thus, the second gate valve member is closed when the first and third gate valve members are open, and vice versa, the second gate valve member is open when the first and third gate valve members are closed. In the position of the gate valve members shown in Figure 1, the top soil and seed mixture is discharged through the funnel 33 onto the closed partition 34, while the mixture previously in the top chamber 50 between the first and second gate valve members, is discharged into the second or lower chamber 51 which is defined by the two partitions 35 and 36. Upon closing of the second gate valve member 38 and opening of the first and third gate valve members, the gas pressure within the lower chamber 51 will be equalized with the gas pressure existing in the housing 8 and the material in said lower chamber 51 will be discharged directly into the housing 8. Simultaneously, the material on the upper partition 34 will be discharged into the top chamber 50. Preferably, the second gate valve member 38 will open a short time after the closing of the first and third gate valve members and will close a short time before opening of said first and third gate valve members in order to prevent excessive loss of air under pressure to the exterior.

The housing 8 is shown in Figure 4, and comprises a partially spherical side wall 52 closed by an imperforate transverse bottom wall 53 and a top wall 54 which is provided with a centrally disposed substantially rectangular aperture 55. An air inlet tube 56 is rigidly secured to the housing 8 and is in communication with the same, being tangent to the side wall 52 adjacent the top wall 54. An outlet tube 57 is also rigidly secured to the side wall 52 of the housing 8 and is tangent to said side wall 52 adjacent the bottom wall 53. The inlet and outlet tubes 56 and 57 are oppositely directed and are in communication with the housing 8 at substantially the same peripheral area of the wall 52, so that the gas stream entering the housing through the inlet tube 56 will circulate inside the housing 58 in a closed loop around the internal face of the side wall 52 and leave said housing 8 through the oppositely directed outlet tube 57. The housing 8 is further provided with a transverse partition 58 which consists of a substantially flat disc disposed substantially parallel to the bottom and top walls 53 and 54 and substantially equally spaced from said walls. The partition 58 is provided with a sector-shaped aperture 59, one radial edge portion 60 of which is bent upwardly to form a lip extending to a point adjacent the inside face of the top wall 54 at the junction of said top wall with the partly spherical side wall 52. Thus the gas stream entering the housing 8 through the inlet tube 56 will first travel in the top chamber defined between the top wall and the partition 58 and will then enter through the sector-shaped aperture 59 into the lower chamber defined between the partition 58 and the bottom wall 53, said space being in communication with the outlet tube 56. Only part of the air stream will pass directly from the top chamber to the lower chamber of the housing, as shown by arrows 61, and some air will continue around the housing inside the top chamber as shown by the arrows 62.

The mixture of seed and top soil which is intermittently discharged in batch loads from the air lock arrangement 7 into the housing 8 through aperture 55, falls partly onto the partition 58 and partly through the sector-shaped aperture 59 into the lower chamber of the housing 8. Thus, only part of a load discharged by the opening operation of the third gate valve member of the air lock arrangement will be initially taken up by the whirling air stream and be discharged through the outlet tube 57. The remaining part of the load, which has fallen onto the partition 58, will gradually be taken up by the portion of the air stream circulating back along the top chamber and discharged into the lower chamber through the aperture 59.

It has been found that with this arrangement a substantially uniform flow of mixed material is discharged from the hose 9 connected to the outlet 57. Furthermore, despite the moist condition of the top soil, the latter will not stick to the inside surfaces of the housing 8 to gradually throttle the air stream, as has been found to be the case when the batches of material discharged from the air lock arrangement were allowed to fall as a whole directly into a linearly moving air stream.

The machine, according to the present invention, is adapted to be mounted on a tractor or the like vehicle, preferably in a transverse manner such that the inclined outside walls of the hopper 1 and 3 will extend at the side of the tractor for easy loading of the same.

While a preferred embodiment according to the present invention has been illustrated and described, it is understood that various modifications may be resorted to

I claim:

1. A machine for mixing and ejecting granular materials at least one of which is in substantially moist condition and of small particle size such as topsoil, comprising in combination, a conveyor belt, means to discharge said materials onto said conveyor belt, an airlock system, means to discharge the mixture of materials into said system, a circular housing in communication with the lower end of said air lock system, inlet and outlet tubes to feed and discharge a high velocity gas stream into and from said housing, said tubes being tangential to said housing and oppositely directed and offset transversely of the housing so as to cause said gas stream to follow a substantially helical path inside said housing, a transverse partition inside said housing defining an upper and a lower chamber, said inlet tube being in communication with said upper chamber, an aperture within said partition to establish communication between said upper and lower chambers, so arranged that the materials discharged as batch loads from said airlock system into said housing will partly fall on said transverse partition and partly directly enter said lower chamber through said aperture in said partition to be gradually taken up by the helically moving air stream and discharged through said outlet tube.

2. A machine as claimed in claim 1, wherein said means to discharge said materials onto said conveyor belt comprise hoppers for each of said materials in communication with said conveyor belt.

3. A machine as claimed in claim 1, wherein said conveyor belt is vertically arranged with a downwardly moving run and an upwardly moving run.

4. A machine as claimed in claim 3, wherein said hoppers are adapted to discharge their respective materials into said downwardly moving run of said vertically arranged conveyor belt.

5. A machine as claimed in claim 4, wherein said airlock system comprises at least two vertically superposed airtight chambers closed by gate valves, the upper air chamber adapted to receive material from the conveyor belt and the lower air chamber being disposed vertically above said housing to discharge the material in batch into said housing.

6. Means for introducing batch loads of fine material into a high velocity gas stream comprising, in combination, an airlock system and a housing disposed below said airlock system, said housing comprising a substantially circular side wall and top and bottom walls, said bottom wall being imperforate, said top wall having a central aperture in communication with said airlock system, said housing further including a transverse partition substantially parallel to the top and bottom walls of said housing, said transverse partition having a sector-shaped aperture made therethrough, a marginal portion of said partition along one edge of said sector-shaped aperture being bent upwardly towards said top wall of said housing, said partition forming inside said housing an upper chamber and a lower chamber above and below said partition respectively, an inlet tube for admitting a gas stream into said housing in communication with said upper chamber and tangential to the circular side wall of said housing, an oppositely directed outlet tube for discharging said gas and material stream from said housing in communication with the lower chamber of said housing and tangential to the circular wall of said housing, so arranged and constructed that the batch loads of material discharged from the air lock system into said housing will fall partly through said sector-shaped opening of said partition and partly onto said partition to be gradually taken up by the gas stream moving substantially helically inside said housing from above to below said partition.

7. Means for introducing batch loads of fine material into a gas stream under pressure comprising a housing having an apertured top wall, an imperforate bottom wall and a circular side wall, a transverse partition in said housing defining an upper and a lower chamber, an inlet tube for gas under pressure opening into said upper chamber and substantially tangent to said circular side wall, an outlet tube communicating with said lower chamber and tangent to said circular side wall, said tubes being oppositely directed, said partition having an aperture establishing communication between said chambers, and means to feed batch loads of fine material into said housing through the aperture of said top wall, said material falling partly on said transverse partition and partly into said lower chamber through the aperture in said partition, and being gradually taken up by the gas moving inside said housing to be ejected through said outlet tube.

8. Means as in claim 7, wherein said partition has a disc shape and the aperture in said partition has a sector shape.

9. Means as in claim 8, wherein the marginal portion of said partition along a radial edge of said sector-shaped aperture is bent upwardly towards said top wall.

References Cited in the file of this patent

UNITED STATES PATENTS

| | | |
|---|---|---|
| 2,014,392 | Mackintosh | Sept. 17, 1935 |
| 2,079,061 | Zuckerman | May 4, 1937 |
| 1,171,286 | Wadsworth | Feb. 8, 1916 |
| 2,193,738 | Perrin | Mar. 12, 1940 |
| 2,470,744 | Korn | May 17, 1949 |
| 2,819,122 | Schneider | Jan. 7, 1958 |